Aug. 26, 1958  T. D. WELDIN  2,849,421
CONTINUOUS PROCESS FOR PREPARING
ALKYLATED ALKYLOL UREA RESINS
Filed Aug. 16, 1956
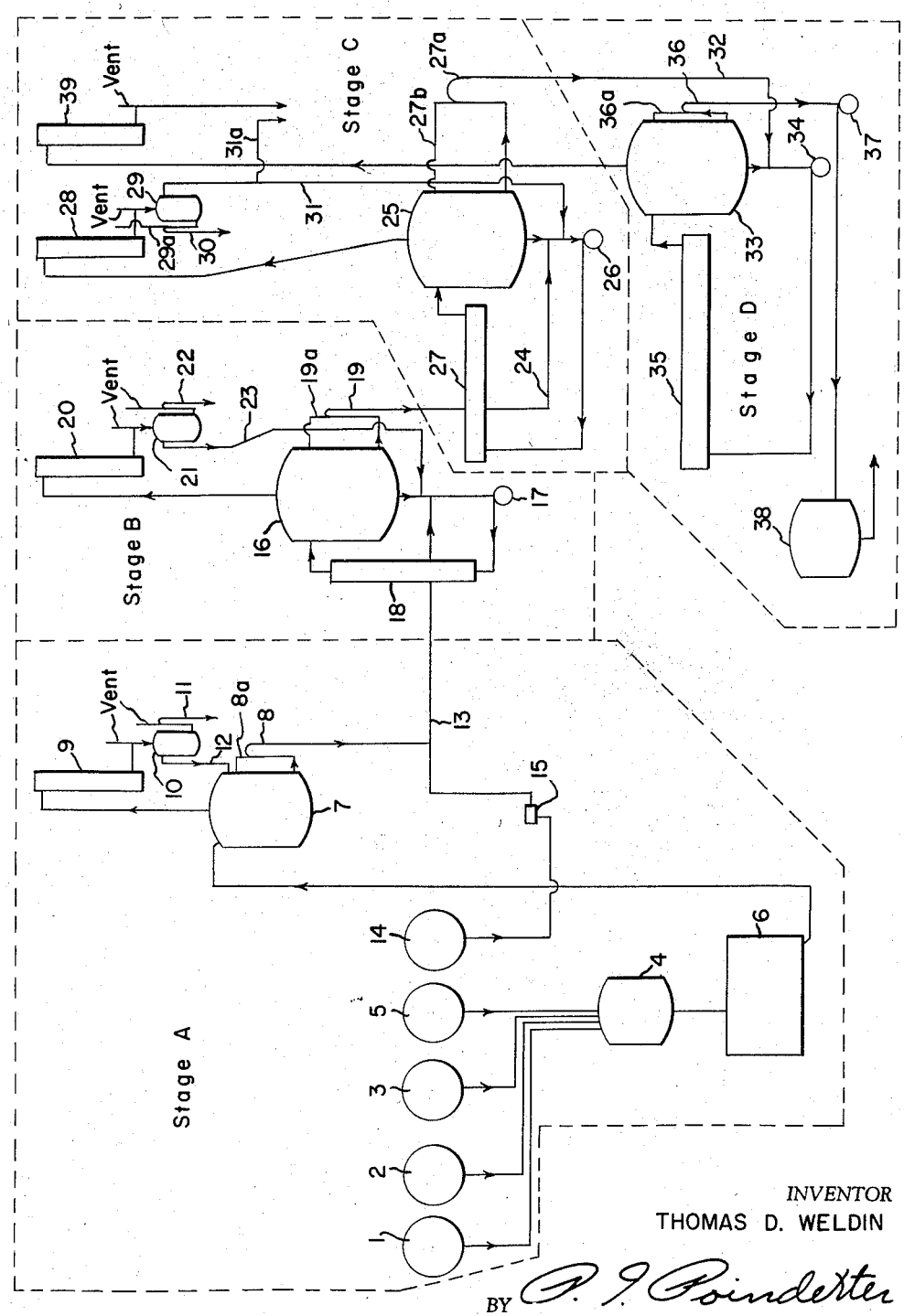
*INVENTOR*
THOMAS D. WELDIN
BY
AGENT

United States Patent Office 2,849,421
Patented Aug. 26, 1958

2,849,421

CONTINUOUS PROCESS FOR PREPARING ALKYLATED ALKYLOL UREA RESINS

Thomas D. Weldin, Wilmington, Del., assignor to E. I. du Pont de Nemours and Company, Wilmington, Del., a corporation of Delaware Application August 16, 1956, Serial No. 604,514

5 Claims. (Cl. 260—70)

This invention relates to a continuous process for preparing alkylated alkylol urea aldehyde resins.

This application is a continuation-in-part of my copending application, S. N. 288,074, filed may 15, 1952, now abandoned.

The present commercial methods for preparing alkylated alkylol urea resins involve the batch process of reacting a urea with an aldehyde to obtain an alkylol urea and subsequently bringing about condensation, etherification and resinification reaction to produce an alkylated alkylol urea resin.

The water of reaction and any other water present is commonly removed by distillation until the desired water content and the desired degree of resinification are obtained. The reactions may be carried out under a variety of operating conditions and ingredient ratios to yield products having a wide range of desirable chemical and physical properties.

An example of a well-known commercial product of this process is butylated urea-formaldehyde resin solution in butyl alcohol and/or other solvents, which product is widely used in the compounding of paints, lacquers and enamels.

The disadvantages of chemical batch processes are well-known; some important ones are high labor cost, product quality variations between batches, and inefficient utilization of the equipment or portions thereof during certain phases of the process. These disadvantages apply to the batch methods for preparing alkylated alkylol urea resins and it is obvious to those skilled in this art that a continuous process which eliminates the disadvantages is desirable.

The principal object of this invention is to provide a continuous process for the preparation of alkylated alkylol urea resins.

A further object is to provide a continuous process for the preparation of butylated urea-formaldehyde resin solutions in butyl alcohol and/or other solvents.

These and other important objects will become obvious as the description of the invention proceeds.

These objects are accomplished by a process which comprises continuously (1) introducing into the reaction apparatus reacting proportions of a urea, an aliphatic aldehyde, and a monohydric aliphatic alcohol at a uniform rate, (2) reacting said constituents under conditions of uniform liquid phase continuous flow, whereby water of reaction is liberated and resinification of said constituents is caused to occur, (3) simultaneously removing water by distillation, and (4) discharging from the reaction apparatus a liquid alkylated alkylol urea resin product.

In practice these continuous and simultaneous reactions are most easily controlled by using apparatus which comprises a connected series of raw materials storage and mixing tanks, reaction vessels (heat exchangers and vapor separators), condensers, metering and circulating pumps, and the necessary controls for regulating temperatures, fluid flow rates, and other process variables. Provision is made for recycling the liquid reaction mixture in any separate unit of the reaction equipment if necessary or desirable. For reasons of economy, provision may be made for separating condensed water from condensed alkylating agent and/or water-carrying solvent and for recycling the latter to any desired unit of the reaction apparatus. While the flow of reaction mixture through the system can be controlled by pumping, it is convenient and economical to use gravity flow between reaction stages. The volume or amount of liquid reaction mixture under treatment in any unit or stage of the reaction apparatus is fixed by adjusting the upper level of an overflow leg through which the reaction mixture flows in leaving the unit. The duration of treatment (reaction time or "hold-up") in any unit is fixed by adjusting the volume or amount of reaction mixture in the unit with respect to the feed rate for that unit. Substantially, the reaction time equals the amount of reaction mixture in the reaction unit divided by the amount of material fed to the reaction unit per unit of time.

In preparing "tailor-made" alkylated alkylol urea resins to meet established finished product specifications, it is well-known to those skilled in the batch process art that each individual product requires a different combination of ingredient ratios, reaction temperatures, and reaction times during the various stages of the batch process. In batch processes, the operating procedures for each stage, and possibly the number of stages, are altered to produce a final product having the desired specifications. In the continuous process of this invention, where uniform flow from stage to stage is essential, a change in finished product specifications may require not only an alteration in the process variables in certain stages, but also an alteration in the number of units in the reaction apparatus. Therefore it is to be understood throughout the description of this invention that the reaction apparatus, the number of units therein, the capacities thereof, and the operating characteristics of the reaction vessels and auxiliary equipment are dependent upon the reaction requirements of the desired products. Hence it is to be understood that a deviation from the described process may involve a corresponding deviation from the described apparatus. However, the necessary changes will become obvious as the description of this invention proceeds.

The invention is described with reference to the accompanying drawing and the following detailed description of the process of making an illustrative product, namely a butanol solution of a butylated urea-formaldehyde resin.

In stage A of the process butanol and 50% aqueous formaldehyde are introduced along with urea from vessels 1, 2 and 3 respectively, into a dissolving vessel 4. After solution of the ingredients is complete dilute caustic (5% sodium hydroxide) is introduced into the solution from tank 5 until a pH of 7.0–8.0, preferably 7.0–7.2 is reached. Up to this point the process does not differ substantially from the batch process.

The solution of urea in the butanol and aqueous formaldehyde from tank 4 is delivered to feed solution tank 6. The feed solution from tank 6 is continuously fed at a uniform rate into the top of reactor vessel 7 and flows therefrom at a uniform rate through overflow leg 8. Water and butyl alcohol are distilled out of the reactor vessel 7 through condenser 9 into water separator 10 where water phase is removed from the system through outlet pipe 11 and the butyl alcohol phase is returned to the reactor vessel 7 through pipe 12. The temperature in the reactor vessel 7 is maintained at 90–95° C. The average reaction time in reactor vessel 7 is about 40 minutes. Under the alkaline conditions in reactor vessel 7, dimethylol urea and its butyl ethers are formed.

In stage B of the process the stage A effluent from the reactor vessel 7 flows continuously at a uniform rate from overflow leg 8 through feed line 13 where it meets a catalyst solution (37.5% solution of monobutyl acid phthalate dissolved in butyl alcohol) pumped through metering device 15 from storage vessel 14. The stage A effluent from the reactor vessel 7, the acid catalyst solution, along with partially reacted material from stage B vapor separator vessel 16 are delivered to pump 17 which continuously circulates the mixture through heat exchanger 18 and into the top portion of stage B vapor separator vessel 16.

Partially reacted material also flows continuously at a uniform rate from stage B vapor separator vessel 16 through overflow leg 19. Water and butyl alcohol distill out of the stage B vapor separator 16 through condenser 20 into water separator 21 where the water phase is removed from the system through outlet pipe 22 and the butyl alcohol phase is returned to the system through pipe 23 and pump 17 where it is mixed with the effluent from the reactor vessel (stage A).

The average time the reaction mixture is in stage B vapor separator vessel 16 is about 90 minutes and the reaction temperature is 93–96° C. In this stage dimethylol urea and its ethers are partially condensed and converted to resin.

In stage C of the process the effluent from stage B vapor separator 16 flows continuously through overflow leg 19 at a uniform rate into feed line 24. This effluent along with partially reacted material from stage C vapor separator 25 is delivered to pump 26 which continuously circulates the mixture through heat exchanger 27 and into the top portion of stage C vapor separator vessel 25. Water and butyl alcohol distill out of stage C vapor separator vessel 25 through condenser 28 into water separator 29 where the water phase is removed from the system through outlet pipe 30 and a portion of the butyl alcohol phase is returned to the system through pipe 31 and pump 26. The remaining butyl alcohol phase is removed from the system through outlet pipe 31A. This results in a substantial concentration of the reaction mixture.

The average time the reaction mixture is in stage C vapor separator vessel 25 is about 90 minutes and the reaction temperature is 100–105° C. In this stage more dimethylol urea and its ether are further condensed and the reaction mixture becomes more resinous. Material leaving stage C vapor separator vessel 25 contains only a small amount of water.

In stage D of the process the effluent from stage C vapor separator vessel 25 flows continuously through overflow leg 27A at a uniform rate into feed line 32. This effluent along with substantially completely reacted material from stage D vapor separator vessel 33 is delivered to pump 34 which continuously circulates the mixture through heat exchanger 35 into the top portion of stage D vapor separator vessel 33.

Resin solution at about 60% solids flows continuously at a uniform rate from stage D vapor separator vessel 33 through overflow leg 36 to pump 37 and then through filter 38 to storage. Substantially dry butyl alcohol is distilled out of the system through condenser 39. Butyl alcohol from condenser 39 and from outlet line 31A can be reused after complete drying by introducing back into the system at storage tank 1.

The average reaction time in stage D vapor separator vessel 33 is about 30 minutes and the solution temperature is 113–118° C. In this stage the resin solution is mainly concentrated by the removal of butyl alcohol plus small amounts of water but a minor amount of condensation and resinification also takes place. To avoid syphoning the contents from the various reactor stages the overflow legs (pipes 8, 19, 27a and 36) are vented to their respective reaction vessels by pipes 8a, 19a, 27b and 36a, respectively, as shown in the drawing.

When the product is to be relatively low in water content, sufficient butyl alcohol is distilled from the mixture in reaction stage C to give the desired degree of dryness.

The reaction is carried out at substantially atmospheric pressure; i. e., the reaction apparatus is vented to the atmosphere, for instance through the vents in the condensers.

For reasons of economy, the water phase of the condensate from the various reaction stages may be transferred to a stripper (not shown in drawing).

The operating conditions recorded in the following table represent the reaction during normal uniform operation, i. e., after each unit of the reaction apparatus and auxiliary equipment had been filled to its normal operating capacity and was operating uniformly within the indicated conditions of flow rates, temperatures, etc.

Stage A:
  Ingredient mixture fed into system—
    Solid urea* _____ 4.84 lbs. per hr.
    n-Butyl alcohol* _____ 11.60 lbs. per hr.
    Formaldehyde solution* (50% in water). 10.55 lbs. per hr.
    Caustic solution* (5% NaOH in water). 0.09 lbs. per hr.
  Mixture from stripper fed into system—
    n-Butyl alcohol _____ 4.83 lbs. per hr. (est.).
    Formaldehyde _____ 0.14 lbs. per hr. (est.).
    Water _____ 1.18 lbs. per hr. (est.).
  Reaction temperature _____ 90–95° C.
  Reaction time (hold-up) _____ 40 minutes.
Stage B:
  Catalyst mixture introduced into system with effluent from Stage A—
    Phthalic anhydride* 0.19 \
    n-Butyl alcohol, *0.59 /  _____ 0.78 lbs. per hr.
  Reaction temperature _____ 93°–96° C.
  Reaction time (hold-up) _____ 90 minutes.
  Volatile mixture evaporated _____ 24.38 lbs. per hr. (est.).
  Condensed and separated butyl alcohol returned to reaction. 13.14 lbs. per hr. (est.).
Stage C:
  Reaction temperature _____ 100°–105° C.
  Reaction time (hold-up) _____ 90 minutes.
  Volatile mixture evaporated _____ 25.38 lbs. per hr. (est.).
  Condensed and separated butyl alcohol returned to reaction. 22.98 lbs. per hr. (est.).
Stage D:
  Reaction temperature _____ 113°–118° C.
  Reaction time (hold-up) _____ 30 minutes.
  Volatile mixture evaporated _____ 6.35 lbs. per hr. (est.).
  Fresh dry butyl alcohol* metered into reaction mixture (instead of condensed and separated butyl alcohol— to obtain minimum water content in finished resin solution). 0.98 lb. per hr.
Total ingredients* introduced _____ 28.84 lbs. per hr.
Total water and miscellaneous other materials removed. 8.84 lbs. per hr.
Total resin solution produced _____ 20.00 lbs. per hr.

*Ingredients newly introduced into system.

In this example an estimated 1.75–2.0 mols of water of reaction was liberated per mol of combined urea.

While in the above illustrative example the ingredient ratios and operating conditions must be held within close limits in order to produce continuously the specifically illustrated resin with uniform composition and uniform physical properties, it will be obvious to those skilled in the urea-formaldehyde resin art that the continuous process production of other resins within the broad scope of this invention may require entirely different ingredients, ingredient ratios, order of addition, and operating conditions.

Substituted ureas, such as alkyl- or thiourea, may be used in place of all or part of the urea.

Other aldehydes such as paraformaldehyde or acetaldehyde may be used in place of all or part of the formaldehyde, and aqueous solutions of formaldehyde other than the 50% solution shown may be used.

The preliminary reaction between the urea and aldehyde need not be conducted in an alkaline medium. When an acidic medium is used, the acid may be organic or inorganic; for instance adipic, oxalic, sulfuric, or phosphoric. If an acid medium is used, the urea and aldehyde may, for instance, be introduced continuously in a ratio of more than about 2.5 mols of aldehyde for each mol of urea and reacted in the acidic medium. When the desired finished product requires more than this proportion of urea to aldehyde, the remaining proportion of urea is continuously metered into and reacted with the effluent reaction mixture from the previously mentioned reaction. For instance, if the finished product requires two mols of aldehyde for each mol of urea and the above mentioned preliminary reaction employed 2.5 mols of aldehyde per mol of urea the additional proportion of urea to be metered in would be .25 mol.

When an alkaline medium is used, in the above mentioned preliminary reaction, the alkali may be an inorganic alkaline substance other than sodium hydroxide, such as, for example, calcium hydroxide, potassium hydroxide, sodium carbonate, sodium phosphate and sodium acid phosphate; or it may be an organic alkaline material, such as tributyl amine.

The phthalic acid (anhydride) catalyst disclosed in the illustrative example may be replaced by other organic acids, for instance adipic or oxalic, or by an inorganic acid, for instance sulfuric or phosphoric. Resins useful for specific purposes may be made in an alkaline catalytic medium.

The preferred process employs an alkaline medium for the preliminary reaction between the urea and the aldehyde and an acidic medium for the subsequent reactions.

An alkylol urea, such as dimethylol urea, may be used as a starting material in place of equivalent amounts of the urea and the aldehyde.

All or part of the normal butyl alcohol may be replaced by other monohydric aliphatic alcohols, preferably those having up to 4 carbon atoms, such as, for instance methyl, ethyl, propyl or isobutyl alcohol. The alcohol need not be incorporated in the earliest stages of the reaction but may be added, for instance, after the urea and the aldehyde have reacted or after the resulting alkylol urea has further reacted to produce some of the water of reaction.

While the ratios of the reagents may vary over a wide range, the useful range is from 1.5 to 4.0 mols of the aldehyde and from 1.8 to 4.0 mols of the monohydric alcohol for each mol of the urea or the stoichiometric equivalents thereof, if alternate reagents are used. The preferred range is from 1.9 to 2.5 mols of the aldehyde and from 2.4 to 3.2 mols of the alcohol for each mol of urea.

Toluene, benzene, or other volatile miscible organic solvents may be used as a portion of the solvent in place of an equivalent proportion of monohydric alcohol. Miscible proportions of such solvent may be left in the finished resin if so desired.

The number of stages, or the number of reactors with their auxiliary apparatus, may be varied depending upon the nature of the finished resin and the preferred balance between (1) the degree of accuracy and control desired, and (2) the operating cost and capital investment for the apparatus. The four-stage process described represents the preferred for the specific resin described in the example. Fewer stages (reaction zones) reduce investment and also reduce controlability. Additional stages increase investment without necessarily resulting in a proportionate increase in controlability of product uniformity.

It is obvious that the reaction temperatures and times described in the illustrative example relate to the specific resin described and that each distinct process carried out in accordance with this invention to produce a specific resin will have its own combination of optimum reaction temperatures and times depending principally upon the ingredients, the ingredient ratios, the number of reaction zones, and the required characteristics of the finished resin. Generally, reaction temperatures between 75° and 150° C. are preferred. In the lower portions of this temperature range, the reaction times are longer and may be as much as several hours. In the higher portions, the reaction times are shorter and may be as little as a few minutes.

The process of this invention materially improves the uniformity and reduces the cost of alkylated alkylol urea compositions. Resins produced by this process are useful in plastics, lacquers, enamels, impregnants, adhesives, and the like, and in coatings for flexible substrates such as paper and woven and non-woven fabrics. They may be used alone or in admixture with other resins, plasticizers, pigments, fillers, dyes and other modifying materials.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A continuous process for the preparation of alkylated alkylol urea resins which comprises at least four stages, stage A comprising forming an aqueous mixture (1) of urea, aliphatic aldehyde selected from the class consisting of formaldehyde, paraformaldehyde, and acetaldehyde, and in aliphatic monohydric alcohol having up to 4 carbon atoms; continuously introducing said mixture (1) into the top portion of a reaction vessel, simultaneously withdrawing reaction product from said reaction vessel, distilling said alcohol and water from stage A reaction vessel and returning said alcohol to said stage A reaction vessel; stage B of said process comprising continuously forming a mixture (2) of effluent from said stage A, acid catalyst, aliphatic monohydric alcohol and a portion of the reaction product of said stage B from the bottom portion of the reaction vessel of said stage B, continuously passing said mixture (2) through a heat exchanger into the top portion of said stage B reaction vessel, continuously distilling water and said alcohol from said stage B reaction vessel and returning said alcohol to said stage B reaction vessel, continuously passing another portion of the reaction product of stage B to stage C; stage C of said process comprising continuously forming a mixture (3) of effluent from said stage B, aliphatic monohydric alcohol, and a portion of a reaction product of said stage C from the bottom portion of the reaction vessel of said stage C, continuously passing said mixture (3) through a heat exchanger into the top portion of said stage C reaction vessel, continuously distilling water and said alcohol from said stage C reaction vessel and returning at least a portion of said alcohol to said stage C reaction vessel, continuously passing another portion of the reaction product of stage C to stage D; stage D of said process comprising continuously forming a mixture (4) of effluent from said stage C and a portion of the reaction product of said stage D from the bottom portion of the reaction product of said stage D, continuously passing said mixture (4) through a heat exchanger into the top portion of said stage D reaction vessel, continuously distilling water and said alcohol from said stage D reaction vessel, and continuously withdrawing another portion of the reaction product of stage D as an alcoholic solution of substantially water-free alkylated alkylol urea resin from said stage D reaction vessel, said process steps being carried out at substantially atmospheric pressure.

2. The process of claim 1 in which the ratio of reactants is within the range of from 1.5 to 4.0 mols of the aldehyde and from 1.8 to 4.0 mols of the alcohol for each mol of urea.

3. The process of claim 1 in which the ratio of reactants is within the range of 1.9 to 2.5 mols of the aldehyde and from 2.4 to 3.2 mols of the alcohol for each mol of urea.

4. The process of claim 1 in which an alkaline solution is introduced into stage A of said process.

5. The process of claim 4 in which the pH of the reaction mixture in stage A is between 7.0 and 8.0.

(References on following page)

References Cited in the file of this patent

UNITED STATES PATENTS

| | | |
|---|---|---|
| 2,191,957 | Edgar et al. | Feb. 27, 1940 |
| 2,217,372 | Ludwig | Oct. 8, 1940 |
| 2,260,890 | Edgar | Oct. 28, 1941 |
| 2,537,131 | Grossman | Jan. 9, 1951 |
| 2,544,351 | Parker | Mar. 6, 1951 |

FOREIGN PATENTS

| | | |
|---|---|---|
| 595,607 | Great Britain | Dec. 10, 1947 |

UNITED STATES PATENT OFFICE
CERTIFICATE OF CORRECTION

Patent No. 2,849,421 August 26, 1958

Thomas D. Weldin

It is hereby certified that error appears in the printed specification of the above numbered patent requiring correction and that the said Letters Patent should read as corrected below.

Column 3, line 44, for "ether" read -- ethers --; column 4, line 58, for "thiourea" read -- thioureas --; column 6, line 21, for "in" read -- an --.

Signed and sealed this 28th day of October 1958.

(SEAL)

Attest:
KARL H. AXLINE
Attesting Officer

ROBERT C. WATSON
Commissioner of Patents